(12) United States Patent
Castiglione

(10) Patent No.: US 12,107,678 B2
(45) Date of Patent: Oct. 1, 2024

(54) METHOD FOR SIGNAL PROCESSING OF COOPERATING MICROPHONE RECEIVERS

(71) Applicant: Paolo Castiglione, Vienna (AT)

(72) Inventor: Paolo Castiglione, Vienna (AT)

(73) Assignee: Paolo Castiglione, Vienna (AT)

( * ) Notice: Subject to any disclaimer, the term of this patent is extended or adjusted under 35 U.S.C. 154(b) by 0 days.

(21) Appl. No.: 18/152,002

(22) Filed: Jan. 9, 2023

(65) Prior Publication Data

US 2023/0224075 A1    Jul. 13, 2023

(51) Int. Cl.
| | |
|---|---|
| *H03M 13/00* | (2006.01) |
| *G06F 3/16* | (2006.01) |
| *H04L 1/00* | (2006.01) |
| *H04L 1/20* | (2006.01) |

(52) U.S. Cl.
CPC ............ *H04L 1/0047* (2013.01); *G06F 3/162* (2013.01); *H04L 1/0057* (2013.01); *H04L 1/206* (2013.01)

(58) Field of Classification Search
CPC ....... G06F 3/167; G06F 3/162; H04L 1/0057; H04L 1/0061; H04L 1/0047; H04L 1/0046; H04L 1/206
See application file for complete search history.

(56) References Cited

U.S. PATENT DOCUMENTS

| | | | |
|---|---|---|---|
| 8,239,914 B2* | 8/2012 | Kuhlmann | ......... H04N 21/4383 725/100 |
| 8,670,380 B2 | 3/2014 | Green, III | |
| 9,596,044 B2* | 3/2017 | Nekhamkin | ............ G10L 19/00 |
| 9,917,717 B2* | 3/2018 | Hwang | ................... H04H 20/00 |
| 10,158,449 B2* | 12/2018 | Hwang | ................. H04L 1/0071 |
| 10,382,173 B2* | 8/2019 | Hwang | ............. H04L 27/26524 |
| 10,470,180 B2 | 11/2019 | Mansouri | |
| 2019/0166423 A1 | 5/2019 | Anderson | |

FOREIGN PATENT DOCUMENTS

WO      2017040904 A1     3/2017

OTHER PUBLICATIONS

Aaron Wyner, "Shannon-Theoretic Approach to a Gaussian Cellular Multiple Access Channel," IEEE Trans. Inf. Theory, vol. 40, No. 6, pp. 1713-1727, Nov. 1994.
S.V. Hanly et al. "Information-Theoretic Capacity of Multireceiver Networks," Telecommunication Systems, vol. 1 (1993) pp. 1-42.
(Continued)

*Primary Examiner* — Esaw T Abraham
(74) *Attorney, Agent, or Firm* — Raven Patents, LLC; Anton E. Skaugset

(57) ABSTRACT

Methods for the distributed reception of receivers without significantly increasing the performance requirements of the system. In particular, this object is achieved by a method which is able to strongly improve the quality of the individual samples and thus of the signal emitted by the network in a receiver network with low complexity, without requiring a central coordinator, by means of a continuous, receiver-internal, independent combination of the received data through separate antennas, or which is able to increase the spatial coverage per receiver while maintaining the same quality of wireless transmission rates per microphone, as well as realize every scenario lying in between these extremes.

13 Claims, 7 Drawing Sheets

(56) References Cited

OTHER PUBLICATIONS

Oren Somekh et al. "Shannon-Theoretic Approach to a Gaussian Cellular Multiple-Access Channel With Fading," IEEE Transactions on Information Theory, vol. 46, No. 4, pp. 1401-1425, Jul. 2000.
David Gesbert et al. "Multi-Cell MIMO Cooperative Networks: A New Look at Interference," IEEE Journal on Selected Areas in Communications, vol. 28, No. 9, pp. 1380-1408, Dec. 2010.
Hao Zhu et al. "Distributed In-Network Channel Decoding," IEEE Transactions on Signal Processing, vol. 57, No. 10, pp. 3970-3983, Oct. 2009.
Muhammad Nabeel et al., "Efficient Data Gathering for Decentralized Diversity Combining in Heterogeneous Sensor Networks", 2019 IEEE Wireless Communications and Networking Conference (WCNC); Marrakesh, Morocco, 2019, pp. 1-6, doi: 10.1109/WCNC.2019.8885669.
Hong Liu et al., "Overview of Wireless Microphones—Part I: System and Technologies", in IEEE Transactions on Broadcasting, vol. 61, No. 3, pp. 494-504, Sep. 2015, doi: 10.1109/TBC.2015.2459661.

\* cited by examiner

METHOD FOR SIGNAL PROCESSING OF COOPERATING MICROPHONE RECEIVERS

TECHNICAL FIELD

The present disclosure is directed to audio engineering, and more particularly to methods for signal processing of cooperating microphone receivers.

BACKGROUND

Wireless microphones are playing an increasingly important role in all areas in which microphones are used. In this case, multipath fading, path losses and shadowing (body shadowing in particular) always occur. These can drastically reduce the radio frequency range, in particular in narrowband wireless microphone transmissions, which are particularly advantageous due to their frequency agility. In order to cope with these problems for critical applications in which every audio failure has dramatic consequences (for example during large concerts), leading manufacturers of professional receiver systems have now increased the number of receiving antennas from 2 to 4 (see "Quad Diversity": https://pubs.shure.com/guide/AD4Q/en-US.pdf; retrieved on Oct. 5, 2021). However, the reduction in range and performance fluctuations in receiver error rate can be exacerbated by the interference that is inherent with spectrally dense applications. In some cases this can be to such an extent that the users are forced to deploy redundant receivers with separate antennas to increase the microphone's reception coverage and signal stability. In such scenarios, the users forward redundant copies of the same microphone signal originating from the multiple receivers to a mixer using separate antennas (typically via analog XLR cables or via an audio network over Ethernet, e.g. DANTE®). Based on the comparison of the reception quality data from the receiver, the person operating the mixer then decides which of the different receiver signals shall ultimately be sent (e.g. to the public address (PA) system or to the broadcast system). This procedure has the following disadvantages:

Switching to a more reliable audio stream is done manually, making the process prone to human error;

Fast incurring dropouts due to a fading notch, which means that the quality of the radio path changes from "good" to "bad" within a few milliseconds, cannot be avoided because the human reaction time is far too long in comparison;

the crossfading between the audio signals at the mixer can cause perceivable sound distortions caused by the phase and amplitude jumps between the audio signal copies.

Attempts have therefore been made to allow wireless receivers to work together in order to use the different spatial positions of the antennas to reduce error rates by exchanging part of the data.

The theoretical foundations for maximizing network capacity (in terms of the amount of data traffic that a network can handle at any given time) are, for example, A. Wyner, "Shannon-theoretic approach to a Gaussian cellular multiple access channel," *IEEE Trans. Inf. Theory*, vol. 40, no. 6, pp. 1713-1727, November 1994; or S. V. Hanly and P. Whiting, "Information-theoretic capacity of multireceiver networks," *Telecommun. Syst.—Modeling, Analysis, Design and Management*, vol. 1, no. 1, pp. 1-42, 1993; or O. Somekh and S. Shamai (Shitz), "Shannon-theoretic approach to a Gaussian cellular multiple-access channel with fading," *IEEE Trans. Inf. Theory*, vol. 46, no. 4, p. 2000, July 2000.

Beyond pure information theory, there are numerous articles and patents in the field of demodulation and decoding that deal with the optimization of distributed receiver technologies. The focus is on connecting a plurality of receivers with separate antennas, with the aim of improving reception reliability. As a general basis of the non-patent literature, the following citations are provided: D. Gesbert, S. Hanly, H. Huang, S. Shamai (Shitz), O. Simeone and W. Yu, "Multi-Cell MIMO Cooperative Networks: A New Look at Interference," *IEEE Journal on Selected Areas in Communications* (Volume: 28, Issue: 9, December 2010) and H. Zhu, G. B. Giannakis, and A. Cano, "Distributed In-Network Channel Decoding," *IEEE Trans. on Signal Processing*, Vol. 57, no. 10, October 2009.

The published literature either focuses on cellular local area networks with high computing power—which are powerful but power-consuming, allowing them to employ complex techniques and algorithms to eliminate or even exploit the interference within the wireless network—or on low-complexity, energy-efficient wireless networks without particularly stringent requirements regarding the maximum allowable latency. So high latency is accepted to keep costs and complexity low.

U.S. Pat. No. 10,470,180 B2 describes a general wireless microphone system with one or more "resource managers". The central control point continuously assigns radio resources in the form of time slots or frequencies to the microphone channels and forwards the high-frequency signals to a plurality of receivers. In this case the number of antennas is fixed at two and it is not shown how additional receiving antennas could be used. This application thus deals with network coordination and not processing the respective signals from different antennas.

U.S. Pat. No. 8,670,380 B2 discloses how a plurality of receiver modules with separate antennas receive the same audio source and forward the data to an additional coordination unit of the receiver modules. This coordination unit can select the audio data with the best quality and forward this to an audio output (e.g. a PA). The application uses time division multiplexing (TDMA) for signal transmission. The core of the application is the signal synchronization scheme that is coordinated among the receivers and made possible by the TDMA. The problem therein is that, on the one hand, a coordination unit is absolutely necessary and, more importantly, that in practice for many professional applications only frequency division multiplexing (FDMA) can meet the system requirements, since de facto only FDMA can meet the worldwide EMC standards (for example of the FCC) for the UHF band starting from 470 MHz.

Examples of requirements that can only be met by FDMA, in addition to legal frameworks such as those of the FCC, are a long battery life on portable transmitters, low interference with adjacent channels, a low spectral footprint, low complexity of the hardware designs since no transceivers are required, low latency, etc. FDMA's better suitability compared to TDMA is illustrated by the fact that all professional wireless microphone systems use FDMA. Since, for example, receivers must pass an EMC test and they may otherwise not be sold, the TDMA-based method proposed in U.S. Pat. No. 8,670,380 B2 is not applicable in real professional systems of the state of the art for the UHF-band starting from 470 MHz to 608 MHz.

None of the prior publications deal with the distributed reception of a narrowband transmission by a receiver network with low complexity and the requirements typical for a professional wireless microphone system using FDMA transmission and extremely low latency time (the permissible upper limit of the latency time from the analog audio input of a microphone transmitter to the analog audio output of the receiver is less than 2 ms for professional music applications at the time of the invention). In other words, all of the available literature and patents regarding distributed reception and decoding do not meet the requirements for typical professional wireless microphone applications.

There is therefore a need for a method for the distributed reception of a narrowband transmission by a receiver network that does not require a central coordinator, operates with little complexity and meets the requirements of a system with FDMA transmission and extremely short latency times, which are typical for a professional wireless microphone system.

SUMMARY

The present disclosure is directed to methods for distributed reception by a receiver network that provides significantly increased performance requirements. In particular, the disclosed methods are able to strongly improve the quality of the individual samples and thus of the signal emitted by the network in a receiver network with low complexity, without requiring a central coordinator, by means of a continuous, receiver-internal, independent combination of the received data through separate antennas, or which is able to increase the spatial coverage per receiver while maintaining the same quality of wireless transmission rates per microphone, as well as realize every scenario lying in between these extremes.

In one example, the disclosure includes a method for processing signals of audio receivers (200), where the audio receivers (200) use cables (H) for signal transmission. The method includes a) transmitting data from a microphone (100) via radio to n≥1 antennas (301, 302) of the receiver (200); b) forwarding the received signal from the antennas (301, 302) to input ports (201, 202) of the receivers (200); c) within the receiver (200), baseband modulating the received signals to form baseband data (502) and estimating metadata on the signal quality and signal reliability (501) in a processing step (500); d) forwarding the baseband data (502) and the metadata on timing and signal quality (501) to a block for FEC channel decoding (600) having an interface (X); e) in the decoding block (600), decoding the signal data and detecting errors by forward error correction; f) forwarding compressed audio samples (602) and metadata (601) on reliability and temporal position of the audio data in a frame of a wireless physical layer (PHY) protocol from the decoding block (600) to an audio decoder block (700) with an interface Y; g) in the audio decoder block (700), decompressing the compressed audio samples (602); h) forwarding the audio data (702) and the metadata on the reliability and temporal position of the audio data (601) to a final processing block (800) with an interface (Z); i) extracting from the processing flow: data pairs (501) and (502) at the interface (X); or data pairs (601) and (602) at the interface (Y), or data pairs (701) and (702) at the interface (Z); j) forwarding the extracted data pairs (501)/(502), or (601)/(602), or (701)/(702) to a function block (4000, 6000); k) processing the extracted data pairs by combining or selecting the extracted data pairs using a function ($\mathcal{F}$, $\mathcal{G}$), with the data (502*, 602*, 702* and/or 502, 602, 702) of other receivers (200) present in the function block (4000, 6000) at the interface based on their metadata (501*, 601*, 701* and/or 501, 601, 701) to form data sets $\hat{S}_m$ or $\hat{S}_c$; l) forwarding the processed data sets $\hat{S}_m$, or $\hat{S}_c$ to the next processing block (600, 700 or 800) for local formation of an audio output signal; m) forwarding the processed data sets $\hat{S}_m$, or $\hat{S}_c$ to an output interface 5000; and n) making available at an output interface (203) downstream of the output interface 5000 the processed data sets $\hat{S}_m$, or $\hat{S}_c$.

The features, functions and advantages of the methods discussed herein can be achieved independently in various embodiments of the present disclosure or may be combined in yet other embodiments, further details of which can be seen with reference to the following description and drawings below.

DETAILED DESCRIPTION

The present disclosure provides a method for the distributed reception of a narrowband transmission by a receiver network that is able to strongly improve the quality of the individual samples and thus of the signal emitted by the network in the receiver network with low complexity, without a required central coordinator, by means of a continuous, receiver-internal, independent combination of the received data through separate antennas or to increase the spatial coverage per receiver while maintaining the same quality of wireless transmission rates per microphone, as well as realizing every scenario lying in between these extremes.

Figure 1:
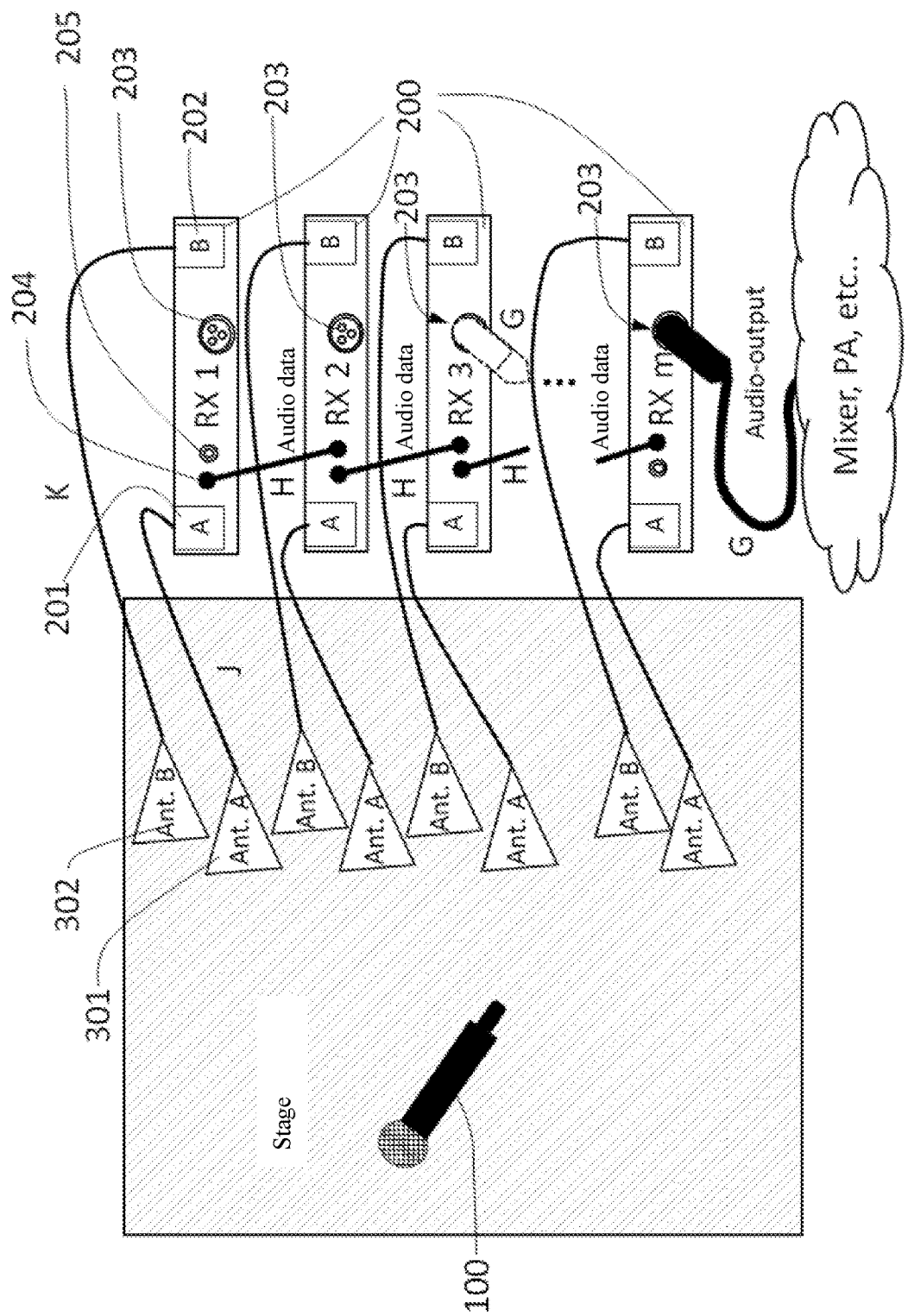
FIG. 1 shows an exemplary structure of a network with a daisy chain topology that can use the method of the present disclosure.

FIG. 1 shows an exemplary structure of a network that can use the method according to the present disclosure, containing a wireless microphone 100 as a transmitter, a plurality of receivers 200 with input ports 201, 202 and one respective output interface 203, one respective data output 204, one respective data input 205, at least one, in this example two respective antennas 301, 302 per receiver, an audio output cabling G, cables H and the coaxial cables J, K, which each connect a respective antenna 301, 302 to the receiver 200. In the example shown, the wireless microphone 100 transmits encoded and modulated audio data to the antennas 301, 302 via a preset carrier frequency. The frequency channel of microphone 100 is always synchronized with the associated receivers 200, therefore all receivers 200 receive the same data of microphone 100 through antennas 301, 302. In the example shown, frequency division multiplexing (FDMA) is typically used for signal transmission in the method according to the present disclosure, but it is not required. Theoretically, it is also possible to use CDMA, TDMA or OFDMA, although a central coordinator would again be required for TDMA or OFDMA. From the antennas 301, 302, the received high-frequency signal is forwarded to the input ports 201, 202 of the receiver 200 via the coaxial cables J, K. In the illustrated example, the receivers 200 are connected via cables H to form a linear topology daisy chain network. The hardware used for H can be any suitable cable technology (wire, coaxial or fiber optic cable). The direct, unidirectional protocol for serial data transmission from output 204 to input 205 between receivers 200 can be defined ad hoc, or selected from any known low-latency digital audio network technology suitable for the particular application. Furthermore, it is possible that the protocol for data transmission is a suitable Audio-over-Ethernet protocol with low latency (e.g. DANTE®). The signal, which is forwarded from one receiver 200 to the next, contains the audio data assembled in the network up to that point in time, as well as the associated metadata (see FIG. 3). Data output 204 and data input 205 can also be bidirectional physical Input/output ports, as in the case of a typical digital network. The order of the receivers in a digital data network can be determined physically or by software. In the example shown, unidirectional ports are shown for direct serial transmission between two receivers, since this is a low-complexity example. Each receiver 200 converts the audio data into the appropriate format (digital-to-analog conversion, audio-over-Ethernet, e.g. DANTE®, etc.) and routes it through the output interface 203 via suitable output cabling G (for example XLR, Ethernet, etc.) to the next processing element (typically an audio mixer, PA system, recording system, etc.). The application of the method is not limited to receivers with two antennas. In principle, arrangements with n antennas per receiver are conceivable, where n≥1. Theoretically, a receiver network would also be possible, the receivers of which have an unequal number of antennas, as long as the compatibility of the receivers with one another is guaranteed. For details on the method sequence according to the present disclosure for a network with a daisy chain topology, see FIG. 4.

Figure 2:
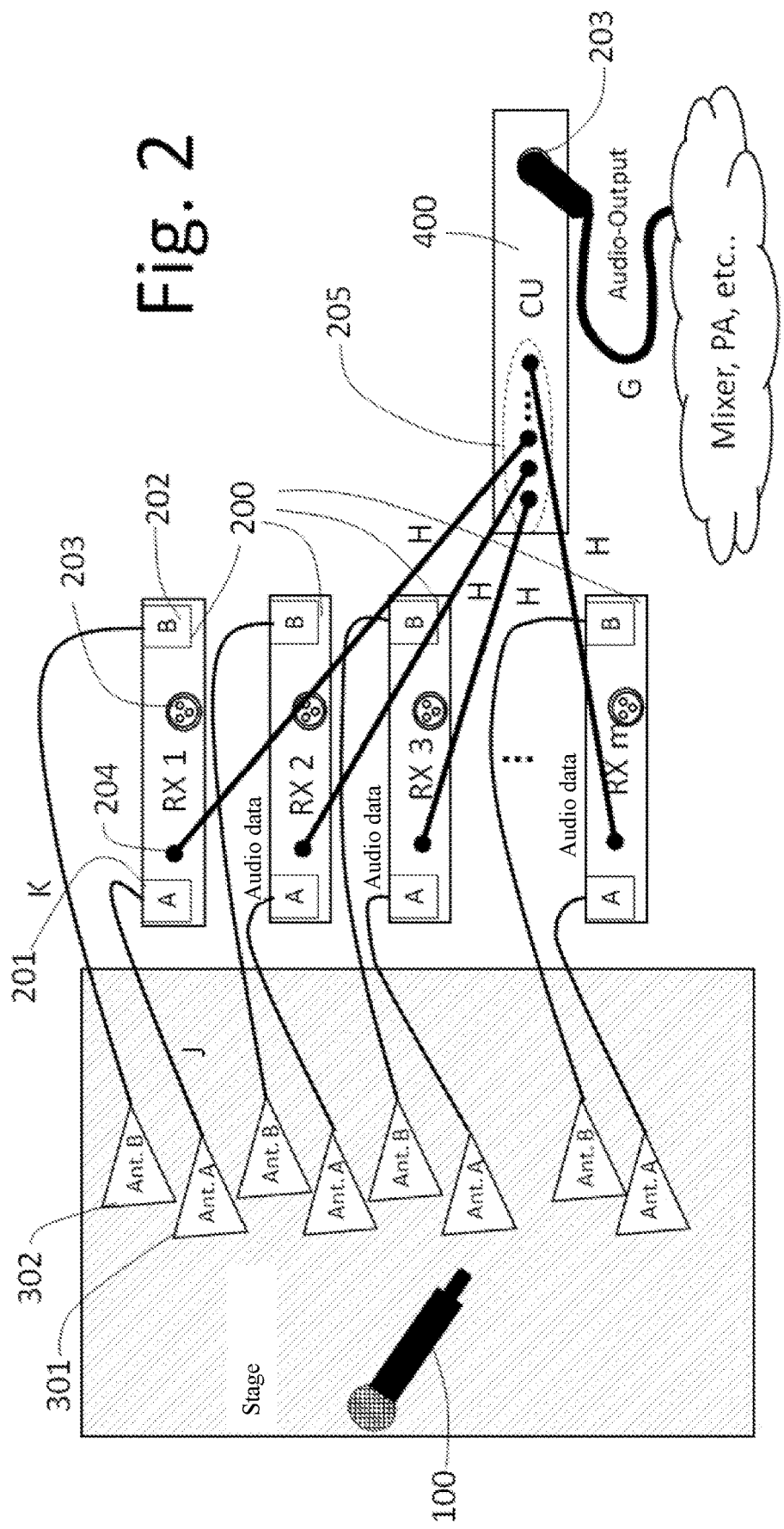
FIG. 2 shows an exemplary structure of a network with a star topology that can use the method of the present disclosure.

FIG. 2 shows an exemplary structure, which is alternative to FIG. 1, of a network that can use the method according to the present disclosure, containing a wireless microphone 100 as a transmitter, a plurality of receivers 200 with HF input ports 201, 202, each with a respective output interface 203, one respective data output 204, at least one, in this example two, respective antennas 301, 302 per receiver, connecting cables H, the coaxial cables J, K, which each connect an antenna 301, 302 to the receiver 200, a central unit 400 with an output interface 203, a multiple data input 205 and an audio output cabling G. The data input 205 can be implemented as a single port connected to an external LAN switch in the case of an Ethernet network if the multiple inputs from the M receivers are merged into a switch of the same LAN network. With the star topology, the data processing within a receiver 200 can take place analogously to the daisy chain topology. The major difference here is that the processed data is transmitted to the central unit 400. This circumstance can be advantageous in some scenarios (for example when using TDMA). The central processing unit 400 can either be a dedicated processing unit, as is known from the prior art, the task of which is only to process the incoming data, or it can also be a receiver that only additionally takes over the data processing tasks. In the second case, the receiver must have both a data output 204 and a data input 205. The application of the method is not limited to receivers with two antennas. In principle, arrangements with n antennas per receiver are conceivable, where n≥1. Theoretically, a receiver network would also be possible, the receivers of which have an unequal number of antennas, as long as the compatibility of the receivers with one another is guaranteed. For details on the method sequence according to the present disclosure for a network with a star topology, see FIG. 5.

Figure 3:
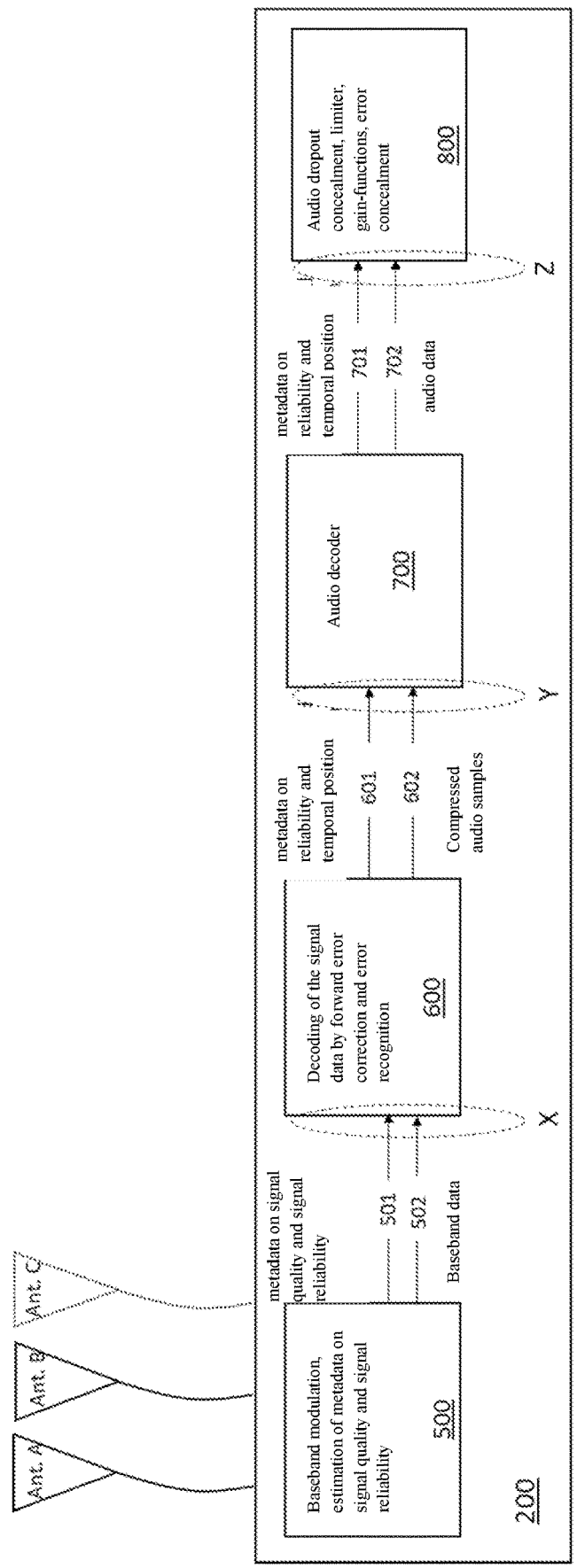
FIG. 3 shows an exemplary method for processing of a receiver signal from a state of the art receiver.

FIG. 3 shows an example of a method sequence for a receiver 200 from the prior art, shown in a signal flow structure with processing blocks, consisting of a data acquisition block 500, metadata on timing and signal quality 501, which together with baseband data (for example PSK modulated symbols or LLRs) 502 are forwarded to an interface X, a FEC/channel decoding block 600, metadata on timing and signal reliability 601, which are forwarded along with compressed audio files 602 to an interface Y, an audio decoder block 700, metadata on timing and signal reliability 701, which are forwarded along with audio files 702 to an interface Z, and a final processing block 800. In the signal acquisition block 500, baseband-modulated digital symbols are generated from the signals received via the antennas 301, 302, in parallel with their information on timing and reliability, as input for the channel decoding method (e.g. Viterbi). Algorithms such as frame synchronization, symbol timing synchronizations, frequency/phase offset synchronization s or similar are considered. Subsequently, in block 500, the baseband signals are determined and the signal quality of the baseband signal is estimated by the receiver 200, for example with regard to the level, the noise behavior (signal-noise-ratio, SNR), or by calculating the likelihood metric. The baseband data 502, together with the metadata on timing and signal quality 501, is forwarded to the receive interface X of the block for FEC channel decoding 600. In decoding block 600, the signal data is decoded by forward error correction (FEC), for example using a Viterbi decoder, Viterbi demodulator or a MAP (maximum a posteriori probability) decoder and error detection (for example using cyclic redundancy check, CRC). In addition to the compressed audio samples 602, the data subsequently transmitted from the decoding block 600 to the audio decoder block 700 also contain metadata 601 for synchronizing the data, relating to the reliability and temporal position of the audio data in the frame of the wireless physical layer (PHY) protocol. The data 601, 602 are then available at the interface Y of the processing chain of the receiver 200. In the audio decoder block 700, the audio data is decompressed. The audio data 702 is then forwarded to the final processing block 800 with the input interface Z in parallel with the metadata 601 on the reliability and temporal position of the audio data. In the final processing block 800, the signal can then be processed further by equalizer filters, limiters, gain functions, error concealment (dropout concealment), or the like. Finally, the completely processed signal is forwarded to the output interface 203. The data can now be accessed in the different processing states. Data acquisition is typically performed at the interface Y. Alternative embodiments, however, provide that the data are extracted sooner or later from the processing chain, i.e. at the interfaces X (i.e. the data 502) or Z (i.e. the data 702), either before the FEC channel decoder 600 or after the audio decoder 700. An advantage of using the compressed audio signal 602 extracted from Y is that the error propagation caused by the audio decoder 700, in contrast to using the uncompressed data 702 and its metadata on temporal position and signal reliability 701 from the Z interface, is not present. On the other hand, by forwarding the data 502 extracted at the interface X and their metadata 501 (so-called "soft input" of the FEC channel decoder 600) to the next receiver 200, the so-called "coding gain" can be significantly improved by the channel decoder 600, provided that the data received from multiple antennas are correctly combined (cf. P. Isomäki and J. Isoaho, "On Diversity Combining", TUCS Technical Report, April 2008). The disadvantage of forwarding data to interface X compared to forwarding data to interface Y is that the input data rate for the digital audio connection can increase significantly. This is true even if efficient compression techniques, such as for example the calculation of LLRs with efficient quantization rates, are used. The lower the input rates, the lower the delay in the digital audio network protocol can be due to buffering, which reduces the overall latency. In addition, the optimal combination of soft inputs from multiple antennas across the entire receiver network can become a matter of extremely high computational effort. These circumstances lead to the problems described in the prior art, such as complex systems and the high computing power required.

Figure 4:
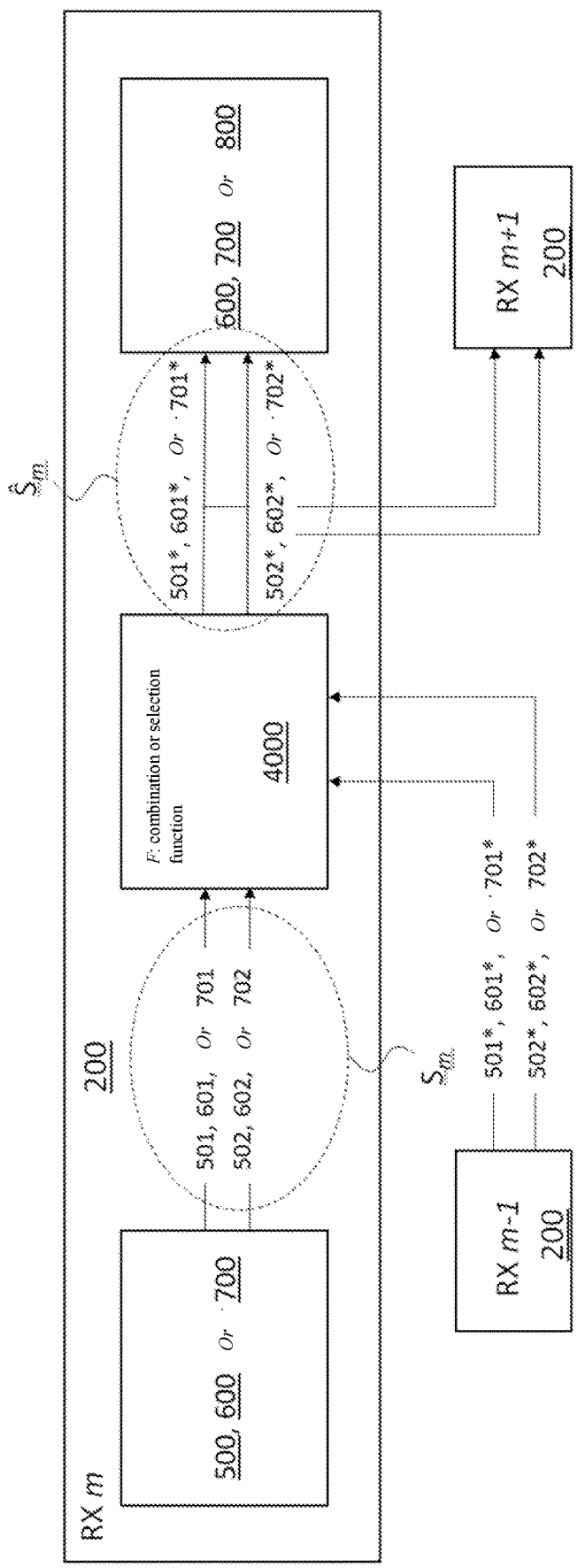
FIG. 4 shows a schematic representation of a method according to the present disclosure for a network with daisy chain topology according to FIG. 1.

FIG. 4 shows a schematic representation of the method according to the present disclosure for a daisy-chain network shown in the form of a signal flow structure with processing blocks according to FIG. 1. It includes the receiver 200, the combination of the paired data 501 and 502, 601 and 602, or 701 and 702 of the daisy-chain network of the receivers 200 in a function block 4000 using a generic function $\mathcal{F}$. For better orientation within the figure, the three receivers 200 shown are identified here with RX m−1, RX m and RX m+1. In the signal detection block 500, baseband-modulated digital symbols are generated from the signals received via the n≥1 antennas 301, 302, in parallel with their information on timing and reliability, as input for the channel decoding method (for example Viterbi). Algorithms such as frame synchronization, symbol timing synchronization, frequency/phase offset synchronizations or similar are considered. Subsequently, in block 500, the baseband signals are determined and the signal quality of the baseband signal is estimated by the receiver 200, for example with regard to the level, the noise behavior (signal-noise-ratio, SNR), or by calculating the likelihood metric. The local data 502 extracted at X, the local data 602 extracted at Y or the local data 702 extracted at Z are forwarded, together with the associated meta data 501, 601 and 701 to functional block 4000, in which the combination or selection function $\mathcal{F}$ is performed. Reference is made to FIG. 3 for the flowchart for obtaining the local data 502, 602 or 702 and their associated metadata 501, 601 or 701. After the function F has been executed, the correspondingly adapted data sets 502*/501*, 602*/601* or 702*/701*, that are dependent on the input data, are forwarded both to the next receiver-internal processing block 600, 700 or 800 for local formation of the audio output signal, as well as to the next (m+1-th) receiver in the network shown in FIG. 1. The combination of the data at the m-th receiver is performed on the basis both of the locally generated data and, if available, of the data originating from the previous m−1-th receiver (at the first receiver in the daisy chain there is clearly no m−1-th receiver). The audio output can be generated on the basis of the locally available data (of at least one receiver) at any node of the network, regardless of the network configuration. It is therefore immediately apparent that the signal is subject to ever-increasing improvement, the more receivers are interconnected in a network, which can provide and process data. The data forwarded to the next receiver-internal processing block 600, 700 or 800, depending on the application, are processed up to the final processing block 800 and then forwarded to an output memory. The data is temporarily stored there and deleted after a certain period of time. In addition, the processed data will be transmitted via a cable G connected to the audio output 203, if a cable G is connected. In this way, redundancy can be achieved in the event that a receiver in the chain fails.

Figure 5:
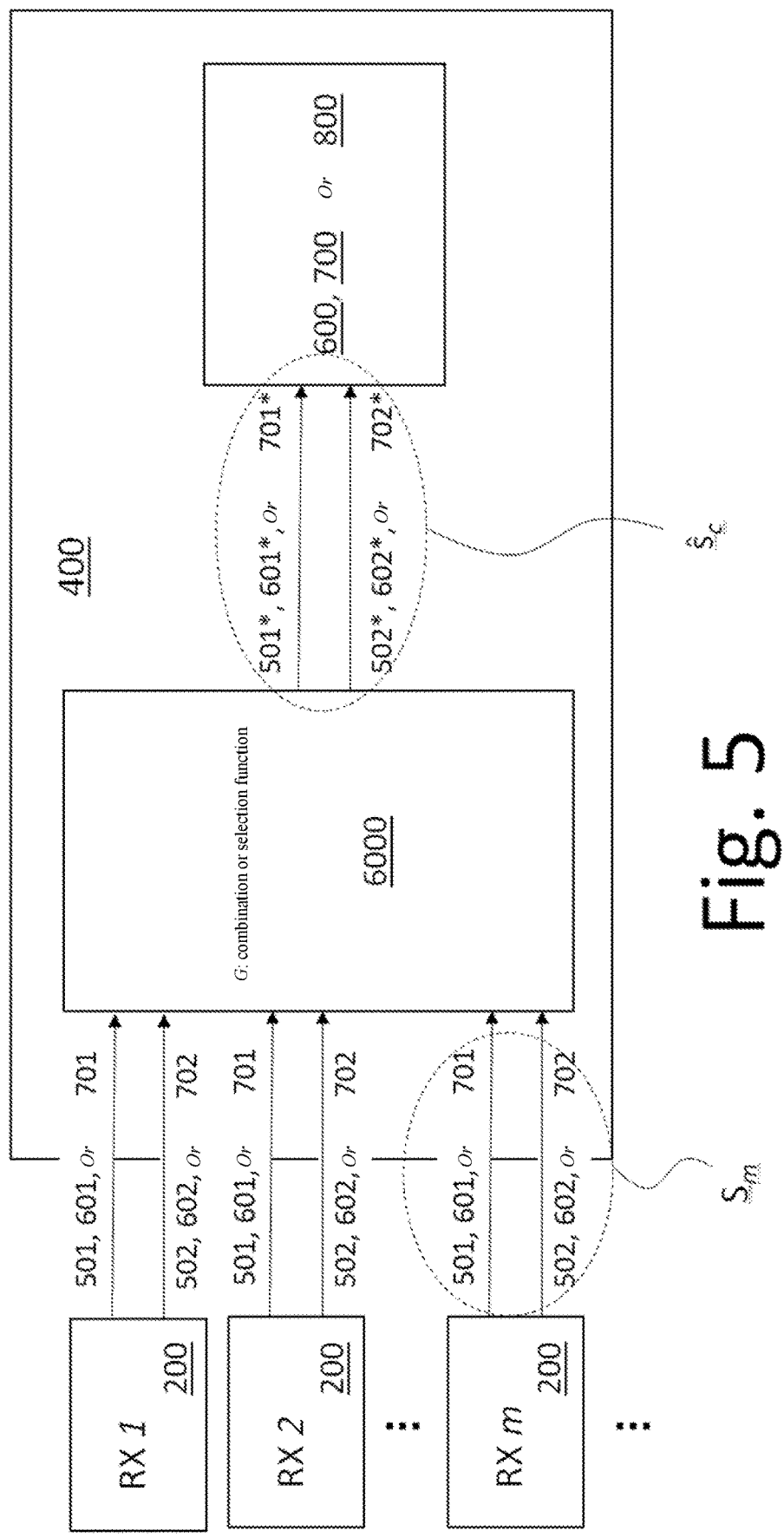
FIG. 5 shows a schematic representation of a method according to the present disclosure for a network with star topology according to FIG. 2.

FIG. 5 shows a schematic representation of the method according to the present disclosure, shown in the form of a signal flow structure with processing blocks, for a star network according to FIG. 2. It comprises the forwarding of data 501, 502, 601, 602, 701, 702 of a single receiver 200 to a central unit 400 and combining the data in a function block 6000 using a generic function $\mathcal{G}$. For better orientation within the figure, the receivers 200 are labeled RX 1 to RX m. The local data 502 extracted at X, the local data 602 extracted at Y or the local data 702 extracted at Z are forwarded, together with the associated meta data 501, 601 and 701 to central unit 400 and forwarded there to functional block 6000, in which the combination or selection function $\mathcal{G}$ is performed. Reference is made to FIG. 3 with regard to the flowchart for obtaining the local data 502, 602 or 702 and their associated metadata 501, 601 or 701. After executing the function g, the correspondingly adapted data 502*/501*, 602*/601* or 702*/701* are forwarded to the next processing block 600, 700 or 800 within the central unit 400 for local formation of the audio output signal. The audio output then takes place after the final processing of the data in the central point 400.

Figure 6:
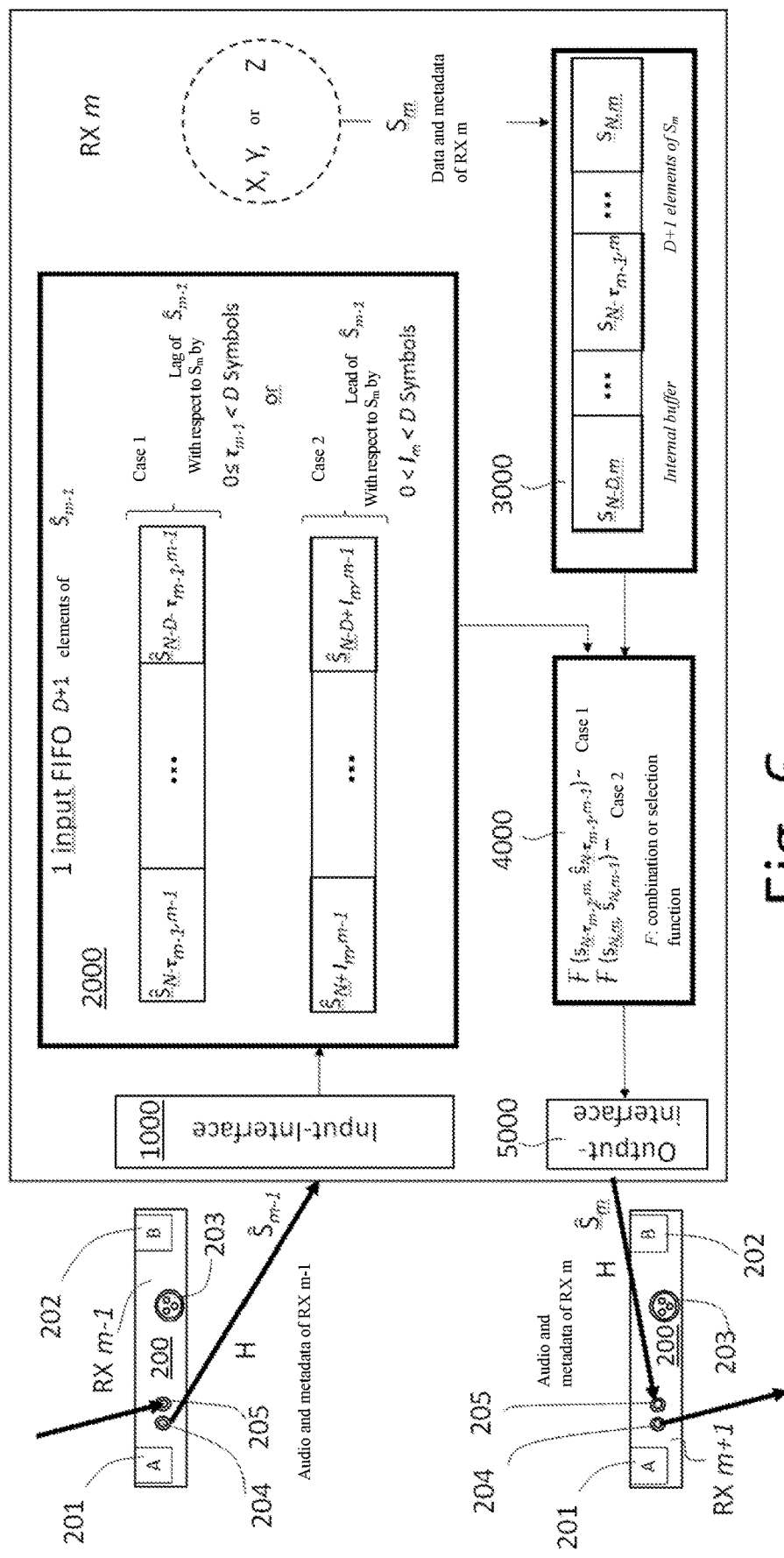
FIG. 6 shows a possible sequence of a method according to the present disclosure for a daisy chain network according to FIGS. 1 and 4.

FIG. 6 shows a possible sequence of the method according to the present disclosure for a daisy chain network according to FIG. 1 and FIG. 4, with a plurality of receivers RX m−1, RX m and RX m+1 in a daisy chain arrangement, an input interface 1000, an input buffer 2000, an internal buffer 3000, a function block 4000 and an output interface 5000. One object of the present disclosure is to achieve the lowest possible latency. Due to the fact that each receiver works for itself and due to the associated type of digital data processing of an asynchronous receiver, the processing of the same data from one receiver is delayed by a period of time $\tau_p \geq 0$ compared to another receiver in the chain. $\tau_p$ is therefore the latency between the fastest and the slowest receiver in the receiver chain that extends to the receiver currently being considered. Since the latency cannot become $\tau_p = 0$, nor can it be accompanied by highs, it is physically limited. In applications where low latency is required, the required upper bound for $\tau_p$ is very low compared to the total latency. In the case shown, only the input interface 1000 and the output interface 5000 make a significant contribution to the overall latency of the digital protocol. The delay due to intrinsic physical wave propagation over the cable H is negligible. The combined latency of input interface 1000 and output interface 5000 can be combined to the interface latency $\tau_i$ of the receiver. It can be about a few μs when a single stream of compressed audio files with a sample rate of 48 kHz is transmitted directly serially using Point-to-Point Protocol and a transfer rate of several megabytes per second (Mbps). The total latency of the network at the output interface 5000 of the m-th receiver is thus defined by $$\tau_m = \tau_p + (m-1)*\tau_i \quad (1)$$

wherein the term $(m-1)*\tau_i$ represents the total latency of the network before the m-th receiver and $\tau_p$, as already described, represents the processing delays in the network. At a given point in time N, the current data $S_m$ is available at one of the interfaces X, Y or Z of the m-th receiver. For example, in the case of interface Y, this is a packet of bits containing the most recent compressed audio sample, its position in the transmitted framing structure, and quality metadata (timing and reliability metadata 601 in FIG. 4) of the sample. The data $S_m$ are buffered in the internal buffer 3000 at time N, namely $\{s_{N-D,m}, \ldots, s_{N,m}\}$, and then transferred to the function block 4000. The data $S_m$ correspond to the data pairs 501/502, 601/602, or 701/702 from FIG. 4. The m-th receiver also receives the data and metadata from the (m−1)-th receiver, which is located upstream in the network. These correspond to the data pairs **501\*/502\*, 601\*/602\*, or 701\*/702\* of the (m−1)-th receiver from FIG. 4 and are received at the input interface 1000 by the m-th receiver and transferred to the input buffer 2000. This input buffer 2000 receives only one input from the preceding ((m−1)-th) receiver and works according to the first-in-first-out principle (1 input FIFO). At time N, the two buffers 2000 and 3000 each have a buffer size D that makes it possible to buffer D+1 elements of $\hat{S}_{m-1}$ or $S_m$. Two cases can now occur for the input buffer 2000**:

1. $\hat{S}_{m-1}$ is delayed with respect to $S_m$ by $0 \leq \tau_{m-1} < D$ symbols, namely the buffer is at time N: $\{\hat{S}_{N-D-\tau_{m-1},m-1}, \ldots, \hat{S}_{N-\tau_{m-1},m-1}\}$, or 2. $\hat{S}_{m-1}$ leads $S_m$ by $0 \leq l_m < D$ symbols, ie the buffer at time N: $\{\hat{S}_{N-D+l_m,m-1}, \ldots, \hat{S}_{N+l_m,m-1}\}$.

The input buffer 2000 then also transfers the data $\hat{S}_{m-1}$ to the function block 4000. The data transmitted to the next receiver, namely the (m+1)-th receiver, are then the result of a generic function $\mathcal{F}$ of the function block 4000 according to the principle $$\hat{S}_{N,m} = \mathcal{F}(s_{N-\tau_{m-1},m}, \hat{S}_{N-\tau_{m-1},m-1}) \text{—Case 1} \quad (2)$$

or $$\hat{S}_{N,m} = \mathcal{F}(s_{N,m}, \hat{S}_{N,m-1}) \text{—Case 2} \quad (3)$$

where equation (2) describes the first case (lag of $\hat{S}_{m-1}$ with respect to $S_m$) and equation (3) describes the second case (lead of $\hat{S}_{m-1}$ with respect to $S_m$). In the case of equation (3), therefore, the time lag of $\tau_{m-1}$ is obviously eliminated. Equation (2) or equation (3) corresponds to a combination of the data $S_m$ received by the receiver (RX m) via its antenna(s) with the newest data $\hat{S}_{m-1}$ coming from the previous receiver (RX (m−1)) of the audio sample in question. The function $\mathcal{F}$ can be a simple choice between the two input arguments based on the quality metadata, a maximum ratio combining (MRC) function of baseband signals based on the estimated SNR, or any other suitable function known in the art. The input buffer 2000 and output buffer 3000 are dimensioned depending on the number of required network points (receivers) and the specified upper limits for $\tau_p$ and $\tau_i$, which represent parameters inherent in the system. To ensure that the strict latency requirements are met, the internal buffer 3000 of the receiver m must be continuously monitored in order to be able to immediately calculate its sample, the $(\tau_m+1)$-th, in function block 4000 and forward it to the output interface 5000. This is done by comparing the timing information of the current sample with that of the buffer, for example by index comparison. The $(\tau_m+1)$-th position of the internal buffer 3000 is thus recognized by comparing the timing metadata present at input buffer 2000 and output buffer 3000. The metadata contains the relative position of the associated sample in the wireless PHY protocol frame. It is assumed here that the length of the reference frame is sufficiently larger than the maximum size of the buffer D so that the receiver can correctly detect the timing based on the position indices that mark the beginning of a new frame. It's realistic that the frame length is even about 10 times larger than $\tau_m$. The arithmetic operations 1000, 2000, 3000, 4000 and 5000 can be carried out with the computing capacities contained in modern digital receivers.

Figure 7:
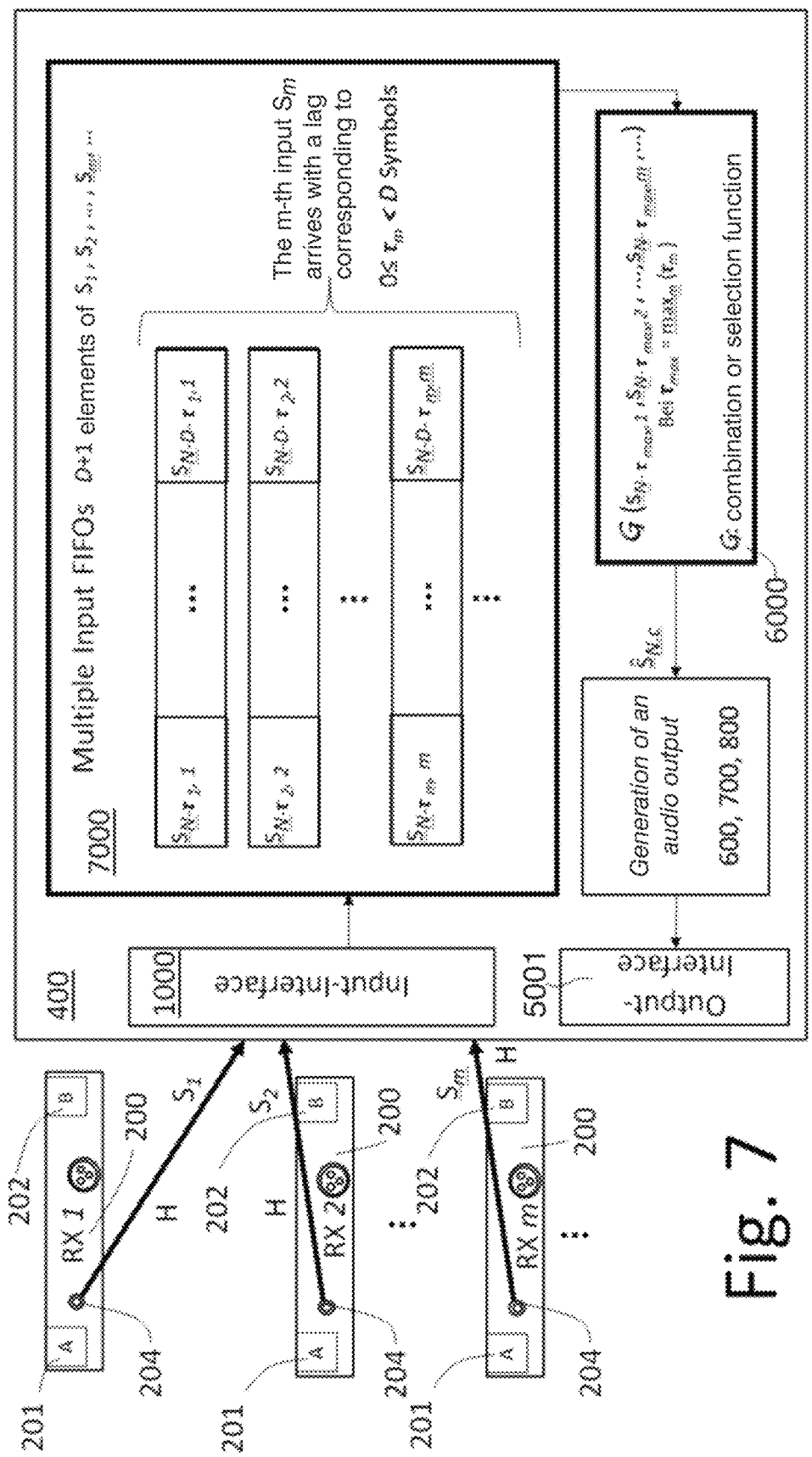
FIG. 7 shows a possible sequence of a method according to the present disclosure for a star network according to FIGS. 2 and 5.

FIG. 7 shows a possible sequence of the method according to the present disclosure for a star network according to FIG. 2 and FIG. 5, with a plurality of receivers RX 1 to RX m connected by the cable H to a central unit (CU; 400 in FIG. 5) in a star arrangement, an input interface 1000, a function block 6000, an input buffer 7000, and an output interface 5001 as well as a block for generating an audio output from either 600, 700 and 800, or 700 and 800, or just 800 (see FIG. 2). Here, too, the aim is to keep the latency as low as possible. In this exemplary method, the data of all receivers $S_m$, wherein m={1, . . . , M} and M is the number of receivers corresponding to the data pairs 501/502, 601/602, or 701/702 from FIG. 5, are transmitted to the CU 400, acquired there at the input interface 1000 and forwarded to the input buffer 7000. However, this is designed for multiple inputs (multiple FIFOs). The input buffer 7000 now buffers up to D+1 elements, similarly to FIG. 6, wherein the data input $S_m$ arrives at 7000 with a lag of $0 \leq \tau_m < D$ symbols, and forwards the data to function block 6000. In function block 6000, the signals are now combined or selected by the generic function $\mathcal{G}$ (equation (4)).

$$\hat{S}_{N,c} = \mathcal{G}(s_{N-\tau_{max},1}, \ldots, s_{N-\tau_{max},m}, \ldots s_{N-\tau_{max},M}) \quad (4)$$

where $\tau_{max} = \max_m(\tau_m)$ applies, since the largest latency always applies. The processed signal $\hat{S}_c$, with $\hat{S}_{N,c}$ as a sample of $\hat{S}_c$ at time N, according to data pairs **501\*/502\*, 601\*/602\*, or 701\*/702\* from FIG. 5, is then forwarded to the block for generating an audio output 600, 700 or 800 and then provided to the output interface 5001**.

Even in one of the simplest cases considered for a receiver network, the case of a daisy chain network already described in FIG. 1, in which the compressed audio signal 602 is to be processed, the method of the present disclosure results in significant advantages over the prior art. This is shown by the following consideration:

In the case of radio channels with independent, identically distributed (iid) fading processes compared to identical antennas 301, 302 and identical associated receivers 200, the probability of a faulty sample at the input of the audio decoder drops to $p^m$ at the m-th node of the daisy chain, where $0 \leq p \leq 1$ is the error probability of the FEC channel decoder 600, given a specified average radio reception strength of the signal during operation. In particularly unfavorable cases where p=10% is realized (which can happen at the edge of the band, or with strong interference), the audio signal would be muted in prior art methods. In contrast, in a system that is operated using the method according to the present disclosure, a highly reliable system performance can be ensured by integrating five additional (redundant) receivers and their associated antennas. In this case, the probability p of an incorrect sample at the input of the audio decoder p drops to $p^{1+5}=0.0001\%$, for example, when using the method according to the present disclosure In realistic scenarios, the probability of an incorrect sample at the input of the audio decoder cannot be considered under such simplified framework conditions, since the fading of the radio channels is not subject to any iid over the distributed connections, since the path losses, shadowing phenomena and interference between the spatially separate paths are very different, for example. As an example of the practical inapplicability of the iid model, it is sufficient to imagine two receivers, each with an antenna, which also cover other spatial areas due to their different positions, which also results in a larger overall spatial coverage for transmissions. The iid fading process assumption between the antennas of different receivers provides a good realistic model when the distances between the antennas are of the order of the wavelength of the transmission carrier frequency. The greater the distance between the antennas of the individual receivers, the worse the iid model applies. If the distance between the antennas becomes too large, then the redundancy of the antennas not only counteracts the fading but can also serve to extend the transmission coverage. The improvement in the probability of an incorrect sample just described can therefore be shifted to a certain extent in favor of a larger spatial coverage per receiver. The ability to increase spatial coverage per audio transmission is of critical importance in certain applications such as motion picture production. In theory, this consideration can be extended in such a way that a significantly increased spatial coverage can be achieved with respect to the prior art, while maintaining the same probability of an incorrect sample.

Another important advantage of running the method in a daisy chain topology is that the total distance that can be covered by the daisy chain is greater compared to the star topology. This is due to the line losses of the cables H. To make things easier to imagine, let us assume ten receivers 200, each of which is connected to the next unit by a cable H with a length of 30 m. In the case of the daisy chain topology, this results in a chain with a length of 300 m, while with the star topology all receivers 200 are grouped in a radius of 30 m around the central unit 400. The daisy chain thus tends to be more flexible in its applicability.

In connection with the interfaces, X, Y and Z, the term "interface" or "receiving interface" does not describe a physical interface, but the point immediately before the implementation of the respective subsequent element in the effect and signal flow diagrams shown in FIGS. 3 to 7. It is therefore only an imaginary interface at which the input variables 501, 502, 601, 602, 701 and 702 lead to the respective function block.

A number of additional aspects and features of the disclosed methods are presented here without limitation as a series of paragraphs, some or all of which can be alphanumerically designated for clarity and efficiency. Each of these paragraphs can be combined with one or more other paragraphs, and/or with disclosure from elsewhere in this application, in any suitable manner. Some of the paragraphs below expressly refer to and further limit other paragraphs, providing without limitation examples of some of the suitable combinations.

1. A method for processing signals of audio receivers (200), and which comprises the steps of:
   a) transmitting data from a microphone (100) via radio to n≥1 antennas (301, 302) of the receiver (200),
   b) forwarding of the received signal from the antennas (301, 302) to the input ports (201, 202) of the receivers (200),
   c) baseband modulating the received signals to form baseband data (502) and estimating metadata on the signal quality and signal reliability (501) in a processing step (500) within the receiver (200),
   d) forwarding the baseband data (502) together with the metadata on timing and signal quality (501) to a block for FEC channel decoding (600) with an interface (X),
   e) decoding the signal data in the decoding block (600) by forward error correction,
   f) forwarding compressed audio samples (602) and metadata (601) on reliability and temporal position of the audio data in the frame of the wireless physical layer (PHY) protocol from the decoding block (600) to an audio decoder block (700) with an interface Y,
   g) decompressing the audio data in the audio decoder block (700),
   h) forwarding audio data (702) and metadata on the reliability and temporal position of the audio data (601) to a final processing block (800) with an interface (Z),
   i) extracting data pairs (501) and (502) at interface (X), or (601) and (602) at interface (Y), or (701) and (702) at interface (Z) from the processing flow characterized in that
   j) the extracted data pairs (501)/(502), or (601)/(602), or (701)/(702) are forwarded to a function block (4000, 6000),
   k) these are combined or selected, using a function ($\mathcal{F}$, $\mathcal{G}$), with the data (502*, 602*, 702* and/or 502, 602, 702) of other receivers (200) present in the function block (4000, 6000) at the interface based on their metadata (501*, 601*, 701* and/or 501, 601, 701) and thus are processed to form the data sets $\hat{S}_m$ or $\hat{S}_c$, respectively (ie (502*)/(501*), (602*)/(601*) or (702*)/(701*)),
   l) the processed data sets $\hat{S}_m$, or $\hat{S}_c$ are forwarded to the next processing block (600, 700 or 800) for local formation of the audio output signal,
   m) the processed data sets $\hat{S}_m$, or $\hat{S}_c$ are further forwarded to an output interface 5000 or 5001,
   n) and the processed data sets $\hat{S}_m$ or $\hat{S}_c$ are available at an output interface (203 or 204) downstream of the output interface 5000 or 5001.

2. The method of paragraph 1, characterized in that one of multiplexing methods FDMA, CDMA, TDMA or OFDMA is used for radio signal transmission.

3. The method of paragraph 1 or 2, characterized in that the receivers (200) are arranged in a daisy chain topology.

4. The method of paragraph 2, characterized in that the data sets (502*/501*), (602*/601*) or (702*/701*) processed by means of function ($\mathcal{F}$) are forwarded, in addition to the next receiver-internal processing block (600, 700 or 800), to the next receiver in the daisy chain.

5. The method of any one of paragraphs 3 or 4, characterized in that the order of the receivers)200(in the daisy chain is physically defined by wiring a digital output)204(of a first receiver)200(with a digital input)205(of the next receiver.

6. The method of any one of paragraphs 3 or 4, characterized in that the receivers )200(are provided, instead of a digital output)204(and a separate digital input)205(, with a digital network connection comprising input/output and the order of the receivers )200(in the daisy chain is determined by software configuration.

7. The method of any one of paragraphs 3 to 6, characterized in that an audio output cable)G(is connected to each receiver)200(.

8. The method of any one of paragraphs 3 to 7, characterized in that the data $\hat{S}_{m-1}$ of the (m-1)-th receiver (200) are transmitted to the m-th receiver and buffered therein in an input buffer (2000).

9. The method of any one of paragraphs 3 to 8, characterized in that the receivers )200(have an internal buffer)3000(for temporarily storing the data sets $S_m$.

10. The method of paragraph 1 or 2, characterized in that the receivers (200) are arranged in a star topology.

11. The method of paragraph 10, characterized in that the processing of the data sets (502*/501*), (602*/601*) or (702*/701*) takes place by means of a function ($\mathcal{G}$) in a central unit (400).

12. The method of paragraph 10 or 11, characterized in that the central unit (400) is part of a mixer.

13. The method of any one of paragraphs 10, 11 or 12, characterized in that an Audio-over-Ethernet protocol is used.

The present invention is not strictly limited to the embodiments illustrated and described by the present disclosure, but can be modified and configured in various ways. The variants shown and described in the individual embodiments can be combined as required.

In the description and the claims, "substantially" means a deviation of up to 10% of the stated value, if physically possible, both downward and upward, otherwise only in the appropriate direction; in the case of degrees (angle and temperature), this means±10°. If there are terms such as "substantially constant" etc., what is meant is the technical possibility of deviation which a person skilled in the art takes as a basis and not the mathematical one. For example, a "substantially L-shaped cross-section" comprises two elongated surfaces, which each merge at one end into the end of the other surface, and whose longitudinal extension is arranged at an angle of 45° to 120° to one another.

All given quantities and percentages, in particular those relating to the limitation of the disclosure, insofar as they do not relate to specific examples, are understood to have a tolerance of ±10%; accordingly, for example: 11% means: from 9.9% to 12.1%. With terms such as "a guide," the word "a" is not to be considered as representing a singular numeral, but rather is to be considered an indefinite article or pronoun, unless the context indicates otherwise.

Unless otherwise stated, the term "combination" or "combinations" mean all types of combinations, starting from two of the relevant components up to a plurality or all of such components; the term "containing" also means "consisting of."

The features and variants stated in the individual embodiments and examples can easily be combined with those of the other examples and embodiments and in particular can be used for characterizing the invention in the claims without necessarily including the other details of the particular embodiment or of the particular example.

The invention claimed is:

1. A method for processing signals of audio receivers (200), where the audio receivers (200) use cables (H) for signal transmission, comprising:
   a) transmitting data from a microphone (100) via radio to n≥1 antennas (301, 302) of the receiver (200);
   b) forwarding the received signal from the antennas (301, 302) to input ports (201, 202) of the receivers (200);
   c) within the receiver (200), baseband modulating the received signals to form baseband data (502) and estimating metadata on a signal quality and a signal reliability (501) in a processing step (500);
   d) forwarding the baseband data (502) and the metadata on timing and signal quality (501) to a block for FEC channel decoding (600) having an interface (X);
   e) in the decoding block (600), decoding the signal data and detecting errors by forward error correction;
   f) forwarding compressed audio samples (602) and metadata (601) on reliability and temporal position of audio data in a frame of a wireless physical layer (PHY) protocol from the decoding block (600) to an audio decoder block (700) with an interface Y;
   g) in the audio decoder block (700), decompressing the compressed audio samples (602);
   h) forwarding the audio data (702) and the metadata on reliability and temporal position of the audio data (601) to a final processing block (800) with an interface (Z);
   i) extracting from the processing flow:
      data pairs (501) and (502) at the interface (X); or
      data pairs (601) and (602) at the interface (Y), or
      data pairs (701) and (702) at the interface (Z);
   j) forwarding extracted data pairs (501)/(502), or (601)/(602), or (701)/(702) to a function block (4000, 6000);
   k) processing the extracted data pairs by combining or selecting the extracted data pairs using a function ($\mathcal{F}$, $\mathcal{G}$), with data (502*, 602*, 702* and/or 502, 602, 702) of other receivers (200) present in the function block (4000, 6000) at the interface based on their metadata (501*, 601*, 701* and/or 501, 601, 701) to form data sets $\hat{S}_m$ or $\hat{S}_c$, respectively;
   l) forwarding the processed data sets $\hat{S}_m$, or $\hat{S}_c$ to the next processing block (600, 700 or 800) for local formation of an audio output signal;
   m) forwarding the processed data sets $\hat{S}_m$, or $\hat{S}_c$ to an output interface 5000 or 5001; and
   n) making available at an output interface (203 or 204) downstream of the output interface 5000 or 5001 the processed data sets $\hat{S}_m$ or $\hat{S}_c$, respectively.

2. The method of claim 1, wherein transmitting data from the microphone (100) via radio to n≥1 antennas (301, 302) of the receiver (200) includes using one of multiplexing methods FDMA, CDMA, TDMA or OFDMA for transmitting the radio signal.

3. The method of claim 1, wherein the receivers (200) are arranged in a daisy chain topology.

4. The method of claim 3, wherein data sets (502*/501*), (602*/601*), or (702*/701*) processed by function (F) are forwarded to the next receiver in the daisy chain, in addition to being forwarded to the next receiver-internal processing block (600, 700, or 800).

5. The method of claim 3, wherein an order of the receivers (200) in the daisy chain is physically defined by wiring a digital output (204) of a first receiver (200) with a digital input (205) of the next receiver.

6. The method of claim 3, wherein the receivers (200) are provided with two digital network connections including input/output instead of a digital output (204) and a separate digital input (205), and the order of the receivers (200) in the daisy chain is determined by a software configuration.

7. The method of claim 3, wherein an audio output cable (G) is connected to each receiver (200).

8. The method of claim 3, wherein the data $\hat{S}_{m-1}$ of the (m−1)-th receiver (200) are transmitted to the m-th receiver and buffered therein in an input buffer (2000).

9. The method of claim 3, wherein wherein the receivers (200) have an internal buffer (3000) for temporarily storing data sets $S_m$.

10. The method of claim 1, wherein the receivers (200) are arranged in a star topology.

11. The method of claim 10, wherein the processing of the data sets (502*/501*), (602*/601*) or (702*/701*) takes place by means of a function ($\mathcal{G}$) in a central unit (400).

12. The method of claim 11, wherein the central unit (400) is part of a mixer.

13. The method of claim 10, wherein an Audio-over-Ethernet protocol is used.

* * * * *